US008665978B2

(12) United States Patent
Nakayama

(10) Patent No.: US 8,665,978 B2
(45) Date of Patent: Mar. 4, 2014

(54) WIRELESS COMMUNICATION APPARATUS AND WIRELESS COMMUNICATION METHOD

(75) Inventor: Taku Nakayama, Yokohama (JP)

(73) Assignee: Kyocera Corporation, Kyoto (JP)

(*) Notice: Subject to any disclaimer, the term of this patent is extended or adjusted under 35 U.S.C. 154(b) by 346 days.

(21) Appl. No.: 13/001,602

(22) PCT Filed: Jun. 25, 2009

(86) PCT No.: PCT/JP2009/061653
§ 371 (c)(1),
(2), (4) Date: Apr. 1, 2011

(87) PCT Pub. No.: WO2009/157520
PCT Pub. Date: Dec. 30, 2009

(65) Prior Publication Data
US 2011/0170622 A1    Jul. 14, 2011

(30) Foreign Application Priority Data

Jun. 27, 2008    (JP) .................................. 2008-169569

(51) Int. Cl.
*H04B 7/02*    (2006.01)

(52) U.S. Cl.
USPC ........... 375/267; 375/260; 375/295; 375/296; 375/299; 375/316; 375/340; 375/347; 455/63.1; 455/67.13; 455/69; 455/101; 455/114.3; 455/132; 455/500; 455/522; 455/562.1; 370/334; 370/464

(58) Field of Classification Search
USPC ......... 375/260, 267, 295, 296, 299, 316, 340, 375/347; 455/63.1, 67.13, 69, 101, 114.3, 455/132, 500, 522, 562.1; 370/334, 464
See application file for complete search history.

(56) References Cited

U.S. PATENT DOCUMENTS

2005/0207367 A1    9/2005  Onggosanusi
2006/0270360 A1*  11/2006  Han et al. ........................ 455/69

(Continued)

FOREIGN PATENT DOCUMENTS

EP    1783940       5/2007
EP    09770230.2    10/2012

(Continued)

OTHER PUBLICATIONS

"Physical Layer for Ultra Mobile Broadband (UMB) Air Interface Specification (C.S0084-001-0 v1.0)", 3GPP2, Apr. 2007.

(Continued)

*Primary Examiner* — Leon Flores
(74) *Attorney, Agent, or Firm* — Workman Nydegger

(57) ABSTRACT

A wireless communication apparatus prevents deterioration of communication characteristics because of a transmission weight of a highest common factor and enhances the communication characteristics of feedback MIMO. A wireless communication apparatus having antennas includes a reception unit for obtaining channel state information of channels received from another wireless communication apparatus, a channel state information calculation unit for dividing a predetermined frequency band into regions, selecting a particular region based on the number of channels included in each of the regions and the channel state information of the channels, and calculating representative channel state information of the predetermined frequency band overall based on the channel state information of the channels included in the particular region, a transmission weight selection unit for selecting a transmission weight based on the representative channel state information, and a transmission unit for transmitting identification information of the transmission weight to the another wireless communication apparatus.

17 Claims, 6 Drawing Sheets

(56) References Cited

U.S. PATENT DOCUMENTS

| | | | |
|---|---|---|---|
| 2007/0249296 A1 | 10/2007 | Howard | |
| 2007/0263736 A1* | 11/2007 | Yuda et al. | 375/260 |
| 2008/0159428 A1* | 7/2008 | Shinozaki | 375/260 |
| 2012/0051248 A1* | 3/2012 | Roh et al. | 370/252 |

FOREIGN PATENT DOCUMENTS

| | | |
|---|---|---|
| JP | 2004007280 | 1/2004 |
| JP | 2006186421 | 7/2006 |
| JP | 2007-019880 | 1/2007 |
| JP | 2008-160822 | 7/2008 |
| JP | 518057/2010 | 12/2011 |
| KR | 20050091573 | 9/2005 |
| KR | 1020060113973 | 3/2006 |
| KR | 10-2010-7029252 | 2/2012 |
| KR | 10-2010-7029253 | 2/2012 |
| WO | 2008/069105 | 6/2008 |

OTHER PUBLICATIONS

"Multiplexing and channel coding (3GPP TS36.212)", 3GPP, May 2008.

Robert W. Heath Jr. "Precoding and Interpolation for Spatial Multiplexing MIMO-OFDM with Limited Feedback" Jul. 30, 2004 [Online: http://www.stanford.edu/group/sarg/Presentations/FAM6_Robert_Heath.pdf].

Robert W. Heath Jr., et al "11n partial proposal quantized precoding with feedback" Presented to the IEEE 802.11n Meeting, Berlin, Germany, Sep. 2004.

Huawei; Overhead reduction of UL CQI signaling by efficient labeling; 3GPP draft; R1-061819; $3^{rd}$ generation partnership project; Mobile Competence Center; 650, Route Des Lucioles; F-06921 Sophia-Antipolis Decex, vol. Ran WG1, no. Cannes, France; Jun. 20, 2006.

Huawei; Unified uplink CQI signaling by efficient labeling; 3GP draft; R1-061246; $3^{rd}$ generation parntership project; Mobile Competence Center; 650, Route Des Lucioles; F-06921 Sophia-Antipolis Decex; France, vol. Ran WG1, no. Shanghai, CN; May 2, 2006.

* cited by examiner

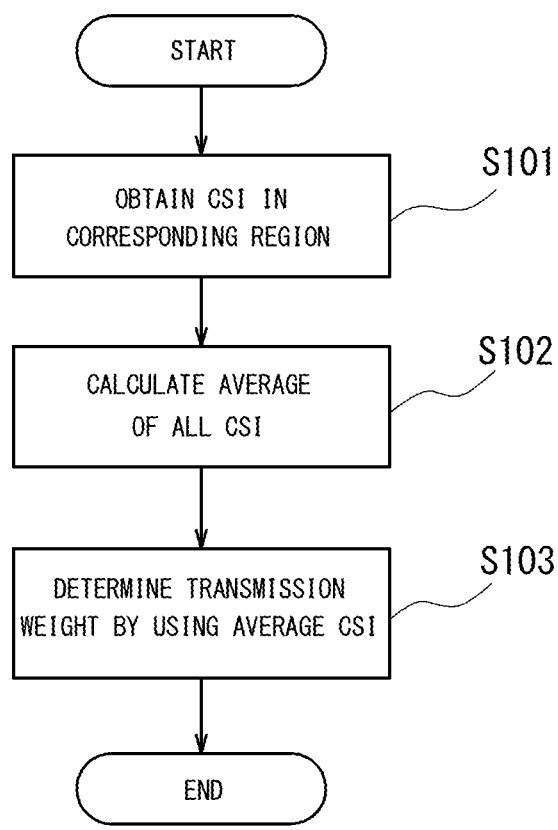

WIRELESS COMMUNICATION APPARATUS AND WIRELESS COMMUNICATION METHOD

CROSS REFERENCE TO RELATED APPLICATION

This application claims priority to and the benefit of Japanese Patent Application No. 2008-169569 (filed on Jun. 27, 2008), the entire contents of which are incorporated herein by reference.

TECHNICAL FIELD

The present invention relates to a wireless communication apparatus and a wireless communication method.

BACKGROUND ART

In recent years, wireless communication systems have used a plurality of antennas for transmission and reception of signals in order to increase communication capacity and to improve communication quality. Such transmission and reception scheme using a plurality of antennas is called MIMO (Multi-Input Multi-Output). In particular, a scheme that a reception terminal feedbacks information related to CSI (Channel State Information: propagation path information) to a transmission terminal is called Closed-Loop MIMO or feedback MIMO, which further improves communication characteristics of MIMO.

The reception terminal can measure $CSI_k$ for a k-th subcarrier (channel) as shown in Formula 1 based on a relationship between a specific reference signal $(x_i)$ transmitted from the transmission terminal at predetermined intervals and a reception signal $(y_{j,\,i})$ of the reception terminal. In Formula 1, TxAnt and RxAnt respectively represent the number of antennas of the transmission terminal and the number of antennas of the reception terminal, whereas $CSI_k$ represents complex matrix having a dimension of RxAnt×TxAnt. In many cases, the reference signals are inserted in different subcarriers for each transmission antenna in fact, such that the reception terminal can separate reception signals. However, for a simple description, it is assumed here that reception signals and reference signals of all subcarriers are obtained separately by respective antennas.

$$CSI_k = \begin{bmatrix} \frac{y_{0,0}}{x_0} & \frac{y_{0,1}}{x_1} & \cdots & \frac{y_{0,TxAnt-1}}{x_{TxAnt-1}} \\ \frac{y_{1,0}}{x_0} & \frac{y_{1,1}}{x_1} & & \frac{y_{1,TxAnt-1}}{x_{TxAnt-1}} \\ \vdots & & \ddots & \vdots \\ \frac{y_{RxAnt-1,0}}{x_0} & \frac{y_{RxAnt-1,1}}{x_1} & \cdots & \frac{y_{RxAnt-1,TxAnt-1}}{x_{TxAnt-1}} \end{bmatrix}$$ [Formula 1]

As for feedback MIMO, the communication characteristic of MIMO is more improved, as the information of the CSI fed back from the reception terminal to the transmission terminal is more detailed. However, an amount of communication data is more increased as the information of the CSI fed back from the reception terminal is more detailed, resulting in tightening the wireless communication capacity of the system. In order to address such a problem, it has been performed that the transmission terminal and the reception terminal commonly have information of transmission weight and the reception terminal feedbacks only index information (identification information) of the transmission weight corresponding to the CSI to the transmission terminal (that is, the reception terminal notifies the transmission terminal of an index number of transmission weight to be used only), which significantly reduces feedback information. In addition, applying a single transmission weight to a plurality of subcarriers collectively can reduce an index itself of the transmission weight to be fed back, enabling further reduction in the feedback information.

For example, as for UMB (Ultra Mobile Broadband, see Non-Patent Document 1, for example) and E-UTRA (LTE) (Evolved UMTS Terrestrial Radio Access, Long Term Evolution, see Non-Patent Document 2, for example), which are of 3.9 generation mobile communication systems (hereinafter, referred to as "3.9G"), the information of the transmission weight is shared as PM (Precoding Matrix) by the transmission terminal and the reception terminal. A plurality of PMs is defined correspondingly to the number of antennas and the like. The reception terminal selects a suitable PM according to the CSI and provides the transmission terminal with PMI (Precoding Matrix Index), which is an identification number of the PM, as feedback. When receiving PMI from the reception terminal, the transmission terminal controls the transmission weight of the plurality of antennas by using the PM identified by the PMI.

In UMB, for example, a frequency band used for communications is divided into eight subbands, and each of the subbands is divided into eight tiles, each of which is divided into sixteen subcarriers, as shown in FIG. 5. In order to select PM commonly applicable to the plurality of subcarriers, the reception terminal calculates an average value of the CSI ($CSI_{Ave}$) in the subband and the tile as a unit by using Formula 2. Here, $N_{CSI}$ represents the number of subcarriers in the subband, and is 128(8×16) in the subband as the unit and 16 in the tile as the unit. When obtaining the average value of the CSI, the reception terminal selects a PM optimum to the average value of the CSI and provides the transmission terminal with the PMI corresponding to the PM as feedback.

$$CSI_{Ave} = \frac{1}{N_{CSI}} \sum_{i=0}^{N_{CSI}-1} CSI_i \qquad \text{[Formula 2]}$$
$$= \frac{1}{N_{CSI}} \left( \sum_{i=0}^{N_{CSI}-1} \mathrm{Re}(CSI_i) + j \sum_{i=0}^{N_{CSI}-1} \mathrm{Im}(CSI_i) \right)$$

FIG. 6 shows changes of the frequency usage efficiency [bps/Hz] of the feedback MIMO when averaging of the CSI necessary for selection of the PMI is performed in the subband and in the tile as the unit and also when there is no control of the transmission weight by selection of the PMI. As shown in FIG. 6, under the same SNR (Signal to Noise Ratio) of the transmission signal, the communication characteristic is improved by control of the transmission weight. It is also shown that the communication characteristic is further improved when PMI is selected in a smaller unit (that is, not in the subband but in the tile, as the unit).

RELATED ART DOCUMENTS

Non-Patent Documents

Non-Patent Document 1: "Physical Layer for Ultra Mobile Broadband (UMB) Air Interface Specification (C.S0084-001-0 v1.0)", 3GPP2, April 2007

Non-Patent Document 2: "Multiplexing and channel coding (3GPP TS36.212)", 3GPP, May 2008

SUMMARY OF INVENTION

Technical Problem

As set forth above, according to a conventional method, the reception terminal selects a transmission weight index (PMI) to feedback to the transmission terminal, based simply on an average value of the CSI of subcarriers regardless of the communication quality of each subcarrier (channel) in a range to apply a common transmission weight (PM) (hereinafter, referred to as a "transmission weight application range"), as shown in FIG. 7. Therefore, a transmission weight of the greatest common factor is selected, which is not optimum to any subcarrier. Such transmission weight of the greatest common factor causes a problem that phases of corresponding plurality of subcarriers rotate and cancel signals on a complex plane, leading to deterioration of the communication characteristics of MIMO using the transmission weight. Especially when the wireless communication quality changes significantly in each frequency in such as a multipath fading environment, it is expected that the wireless communication quality differs greatly in each of the 128/16 subcarriers included in each subband/tile.

An object of the present invention in consideration of the above problems is to provide a wireless communication apparatus and a wireless communication method which prevent deterioration of the communication characteristics by the transmission weight of the greatest common factor and enhance the communication characteristics of the feedback MIMO.

Solution to Problem

In order to solve the above problems, a wireless communication apparatus having a plurality of antennas according to the present invention includes:

a reception unit for receiving signals of channels in a predetermined frequency band from another wireless communication apparatus and obtaining channel state information of the channels;

a channel state information calculation unit for dividing the predetermined frequency band into a plurality of regions, selecting a particular region from the plurality of regions based on a number of channels included in each of the plurality of regions and the channel state information of the channels, and calculating representative channel state information of the predetermined frequency band overall based on the channel state information of the channels included in the particular region;

a transmission weight selection unit for selecting a transmission weight based on the representative channel state information calculated; and a transmission unit for transmitting identification information of the transmission weight to the another wireless communication apparatus.

It is preferred that the channel state information calculation unit divides the predetermined frequency band into the plurality of regions by selecting the channel with power of the channel state information higher than a predetermined threshold.

It is preferred that the channel state information calculation unit divides the predetermined frequency band into the plurality of regions at a position where phase of the channel state information rotates in reverse between adjacent channels.

It is preferred that the channel state information calculation unit divides the predetermined frequency band into the plurality of regions by selecting the channels with rotational amount of phase of the channel state information less than a predetermined threshold.

It is preferred that the channel state information calculation unit divides the predetermined frequency band into the plurality of regions by selecting the channels with amplitude of the channel state information higher than a predetermined threshold.

It is preferred that the channel state information calculation unit calculates a weighted average value of the channel state information of the channels included in the particular region as the representative channel state information of the predetermined frequency band overall, based on power of the channel state information of the channels included in the particular region.

It is preferred that the transmission weight selection unit stores a corresponding relation between the channel state information and the transmission weight and selects the transmission weight stored corresponding to the representative channel state information.

In order to solve the above problems, a wireless communication method of a wireless communication apparatus having a plurality of antennas according to the present invention includes the steps of:

receiving signals of channels in a predetermined frequency band from another wireless communication apparatus and obtaining channel state information of the channels;

dividing the predetermined frequency band into a plurality of regions;

selecting a particular region from the plurality of regions based on a number of channels included in each of the plurality of regions and the channel state information of the channels;

calculating representative channel state information of the predetermined frequency band overall based on the channel state information of the channels included in the particular region;

selecting a transmission weight based on the representative channel state information calculated; and transmitting identification information of the transmission weight to the another wireless communication apparatus.

It is preferred, at the step of calculation, to calculate a weighted average value of the channel state information of the channels included in the particular region as the representative channel state information of the predetermined frequency band overall, based on power of the channel state information of the channels included in the particular region.

It is preferred, at the step of selecting the transmission weight, to select the transmission weight corresponding to the representative channel state information based on a corresponding relation between the channel state information and the transmission weight stored in advance.

Effect of the Invention

According to the present invention, the transmission weight is not obtained by simply calculating an average CSI of subcarriers in a transmission weight application range, but the present invention focuses on a particular subcarrier region expected to have a greatest channel capacity among subcarriers in the transmission weight application range. Then, more accurate CSI is calculated for the subcarriers in the particular region, and thus it is possible to select a transmission weight which further increases the channel capacity in the transmission weight application range overall. Therefore, it is possible to improve the communication characteristics of feedback MIMO by reducing influence by the subcarrier with limited channel capacity as a propagation path, reducing deterioration of accuracy of the CSI caused by a phenomenon that phases are reversed and cancel each other, and selecting a transmission weight having great influence on the subcarrier region with sufficient power.

In addition, the present invention utilizes a characteristic (diversity effect) which, because of the nature of error correction such as convolutional coding (CC) and convolutional turbo coding (CTC) applied to 3.9G, error correction is more effective on data series having distinctive good quality parts and poor quality parts than on data series of basically equal quality overall, under a condition with uniform average power.

BRIEF DESCRIPTION OF DRAWINGS

FIG. 7 is a flowchart of operation of a conventional communication terminal.

DESCRIPTION OF EMBODIMENTS

Embodiments of the present invention will be described with reference to the accompanying drawings.

Figure 1:
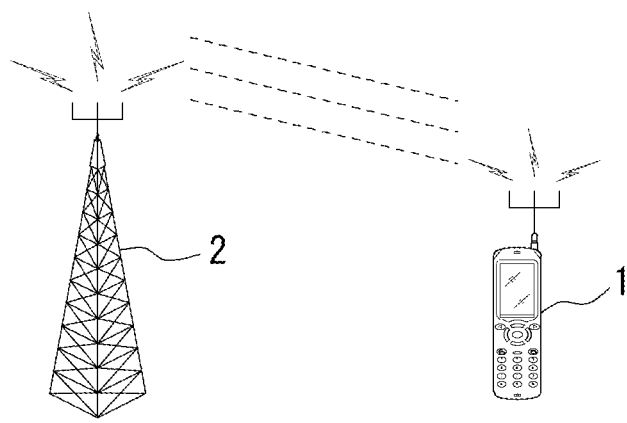
FIG. 1 is a diagram illustrating a schematic constitution of a communication network which a communication terminal according to one embodiment of the present invention can use.

FIG. 1 shows a diagram illustrating a schematic constitution of a communication network which a communication terminal 1 according to one embodiment of the present invention can use. In FIG. 1, the communication terminal 1 performs communication with a base station 2 by MIMO using a plurality of antennas. The communication terminal 1 obtains CSI of each subcarrier from a reference signal transmitted by the base station 2. After performing a predetermined processing on the CSI, the communication terminal 1 selects a transmission weight (PM) which the base station 2 should use, and feedbacks a transmission weight index corresponding to the transmission weight to the base station 2. The base station 2 selects a transmission weight corresponding to the transmission weight index and controls feedback MIMO.

Figure 2:
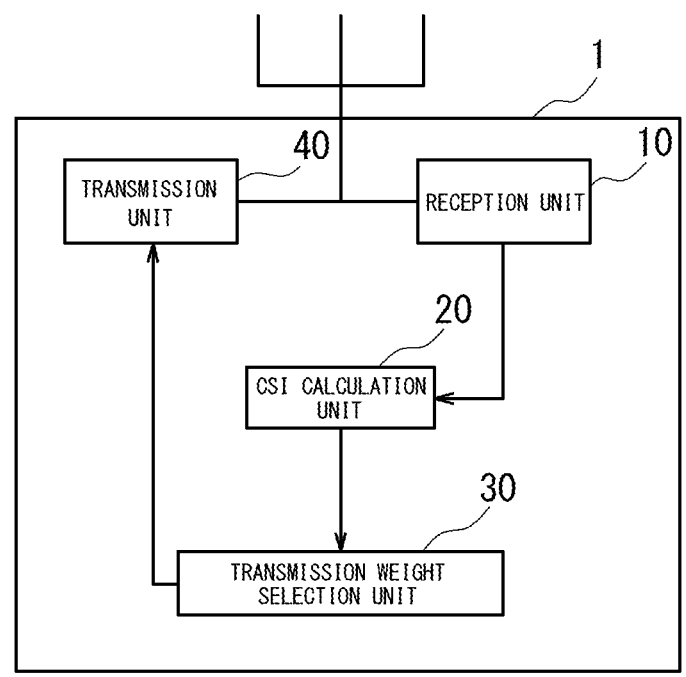
FIG. 2 is a diagram illustrating a constitution of the communication terminal according to one embodiment of the present invention.

FIG. 2 is a diagram illustrating a constitution of the communication terminal 1 according to one embodiment of the present invention. Here, the communication terminal 1 may be, for example, a mobile phone, a laptop computer or a PDA (mobile information terminal) having a communication interface for MEMO. The communication terminal 1 has a reception unit 10 for receiving signals from the base station 2 and obtaining the CSI of subcarriers, a CSI calculation unit (channel state information calculation unit) 20 for obtaining information of CSI from the reception unit 10 and performs a predetermined calculation in association with the CSI, a transmission weight selection unit 30 for selecting the transmission weight index of the transmission weight to feedback to the base station 2 based on a result of calculation by the CSI calculation unit 20, and a transmission unit 40 for transmitting the transmission weight index, selected by the transmission weight selection unit 30, together with communication data and the like to the base station 2.

The reception unit 10 and the transmission unit 40 may be interface devices corresponding to the feedback MIMO. The reception unit 10 and the transmission unit 40 may have normal functions required for wireless communications, such as modulation/demodulation of a signal necessary for transmission and reception of a wireless signal, error correction decode/encode, PS/SP conversion, channel estimation and the like. The CSI calculation unit 20 and the transmission weight selection unit 30 may be any suitable processors such as a CPU (Central Processing Unit), and each function of the CSI calculation unit 20 and the transmission weight selection unit 30 may be configured by a software executed on the processor or a processor exclusive for processing of each function (for example, DSP (Digital Signal Processor)).

Figure 3:
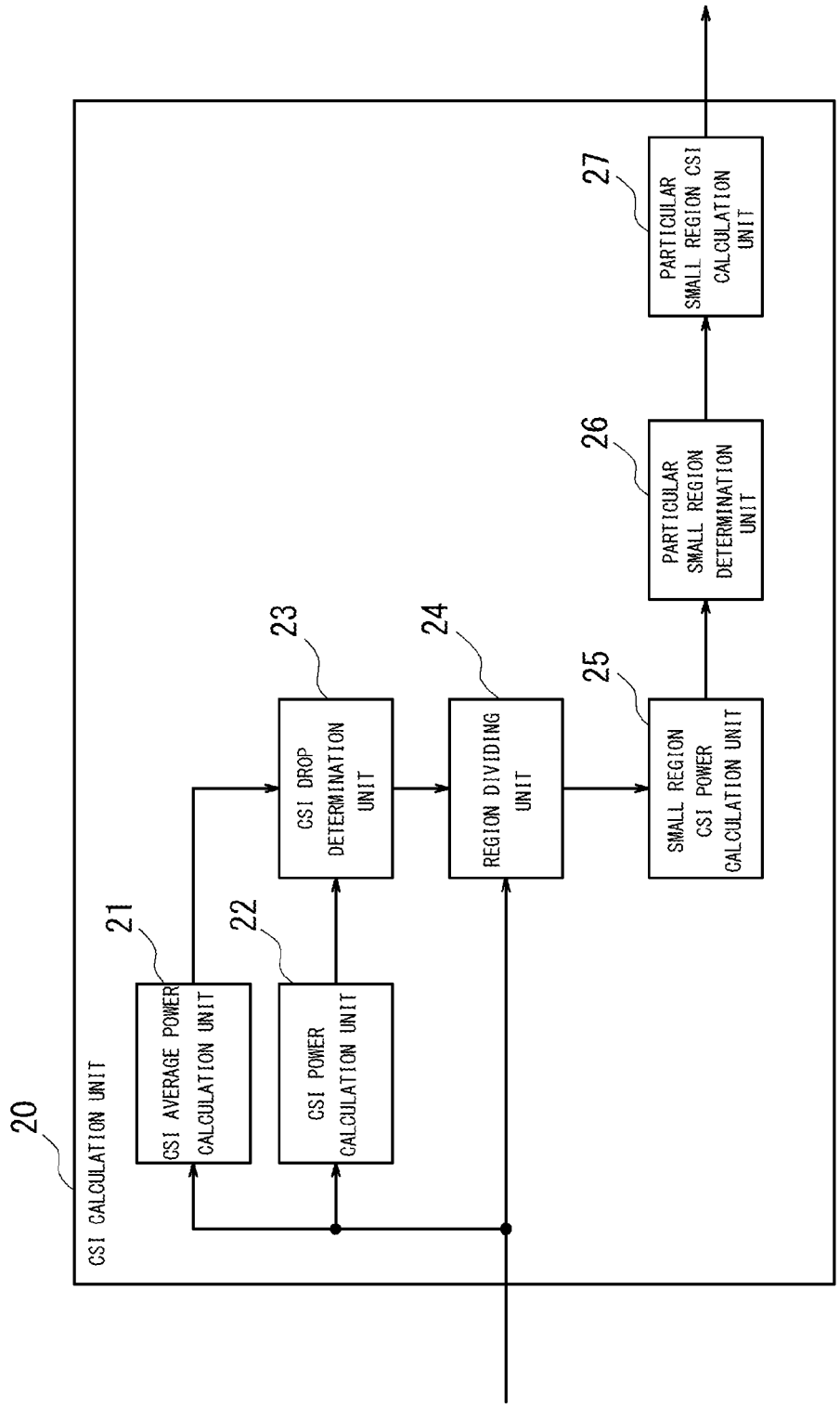
FIG. 3 is a functional block diagram illustrating a schematic constitution of a CSI calculation unit shown in FIG. 2.

FIG. 3 is a functional block diagram illustrating a schematic constitution of the CSI calculation unit 20 shown in FIG. 2. The CSI calculation unit 20 has a CSI average power calculation unit 21 for calculating average power of the CSI in the transmission weight application range, a CSI power calculation unit 22 for calculating power of each CSI in the transmission weight application range, a CSI drop determination unit 23 for determining whether there is a drop in power of the CSI in the transmission weight application range based on results of calculations by the CSI average power calculation unit 21 and the CSI power calculation unit 22, a region dividing unit 24 for dividing the CSI in the transmission weight application range into small regions based on a result of determination by the CSI drop determination unit 23, a small region CSI power calculation unit 25 for calculating power of CSI in the small region for each region divided by the region dividing unit 24, a particular small region determination unit 26 for determining a particular small region used for selection of the transmission weight based on a result of calculation by the small region CSI power calculation unit 25, and a particular small region CSI calculation unit 27 for calculating weighted CSI power of the CSI in the particular small region used for selection of the transmission weight.

Figure 4:
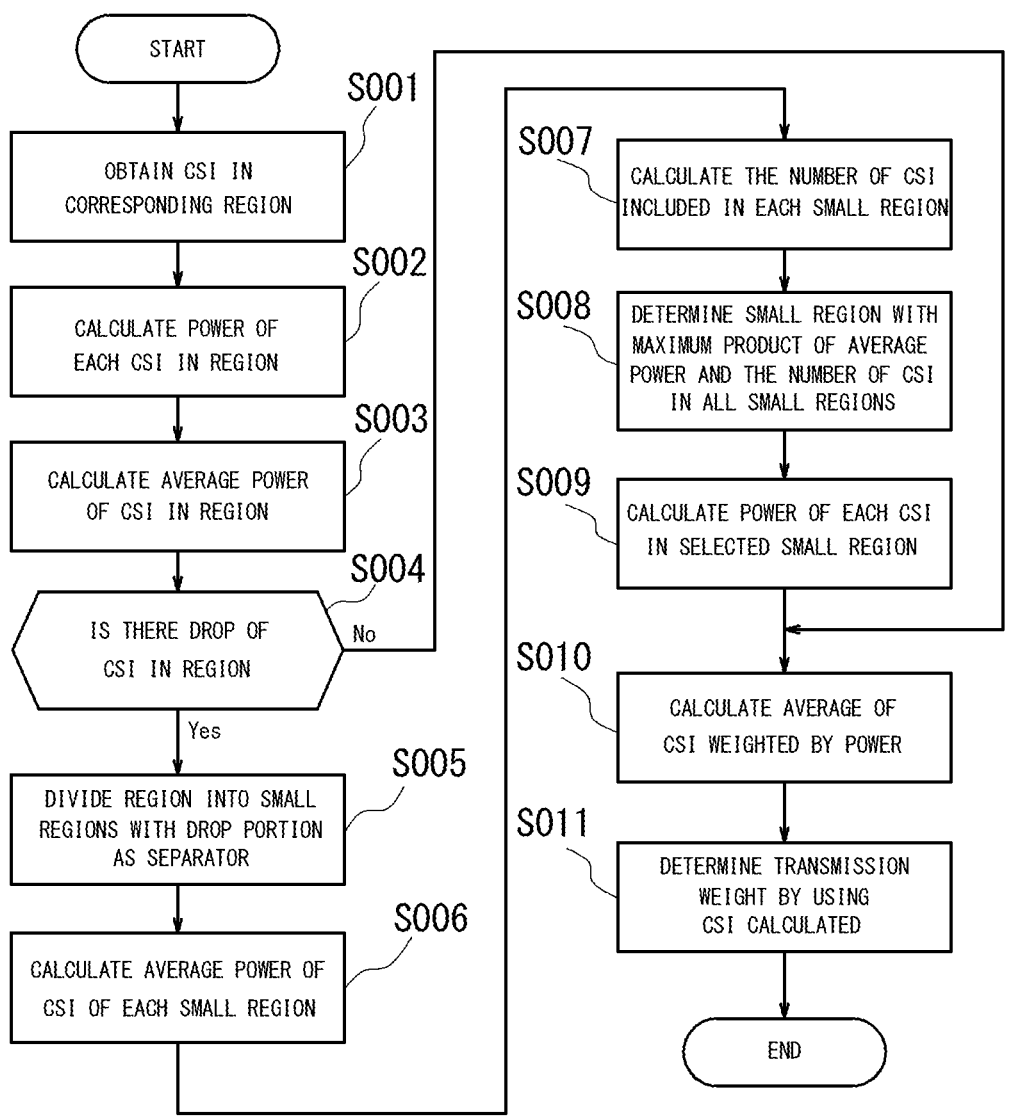
FIG. 4 is a flowchart of operation of the communication terminal according to one embodiment of the present invention.
Figure 5:
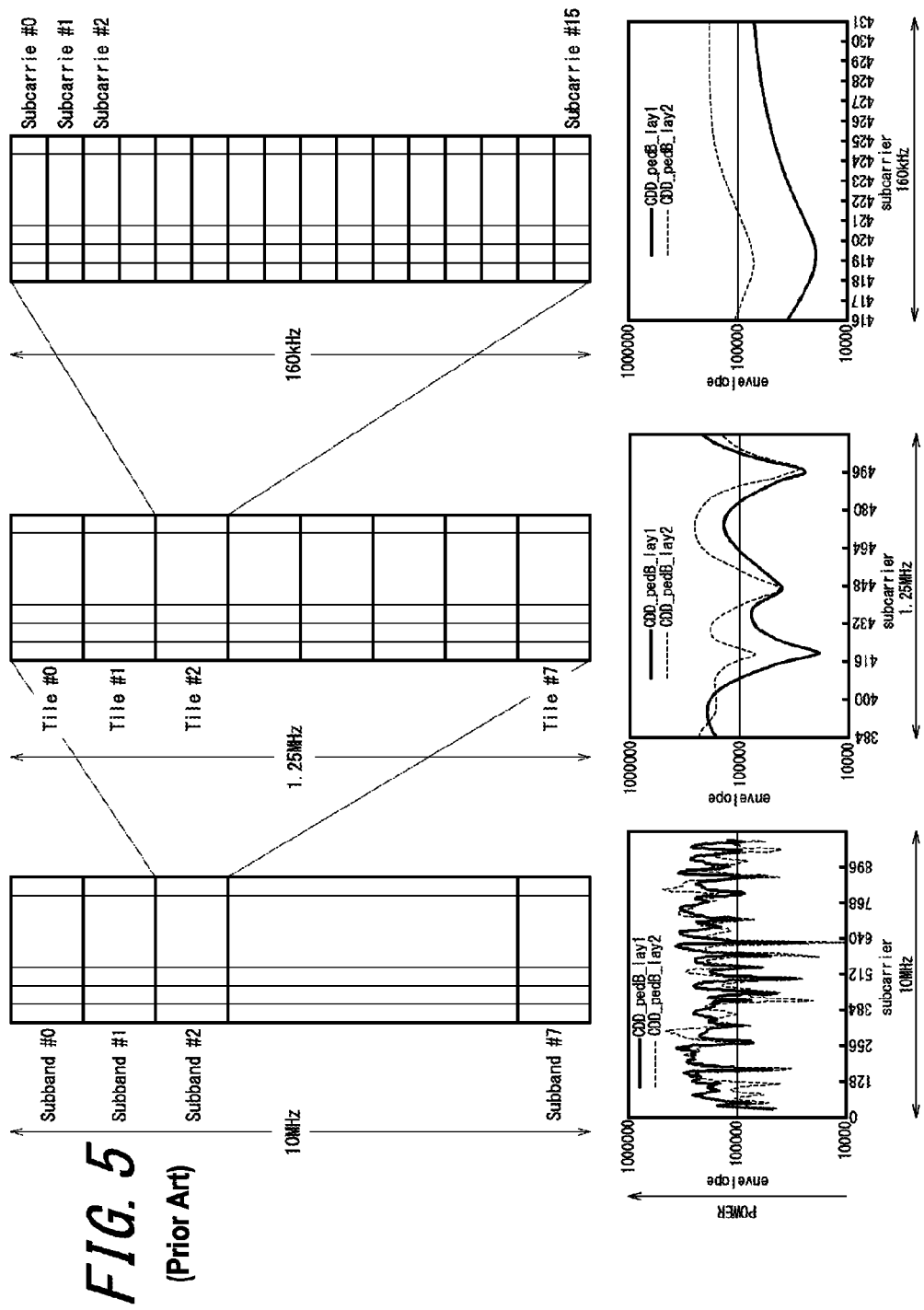
FIG. 5 is a diagram illustrating an example of units of dividing a frequency band.
Figure 6:
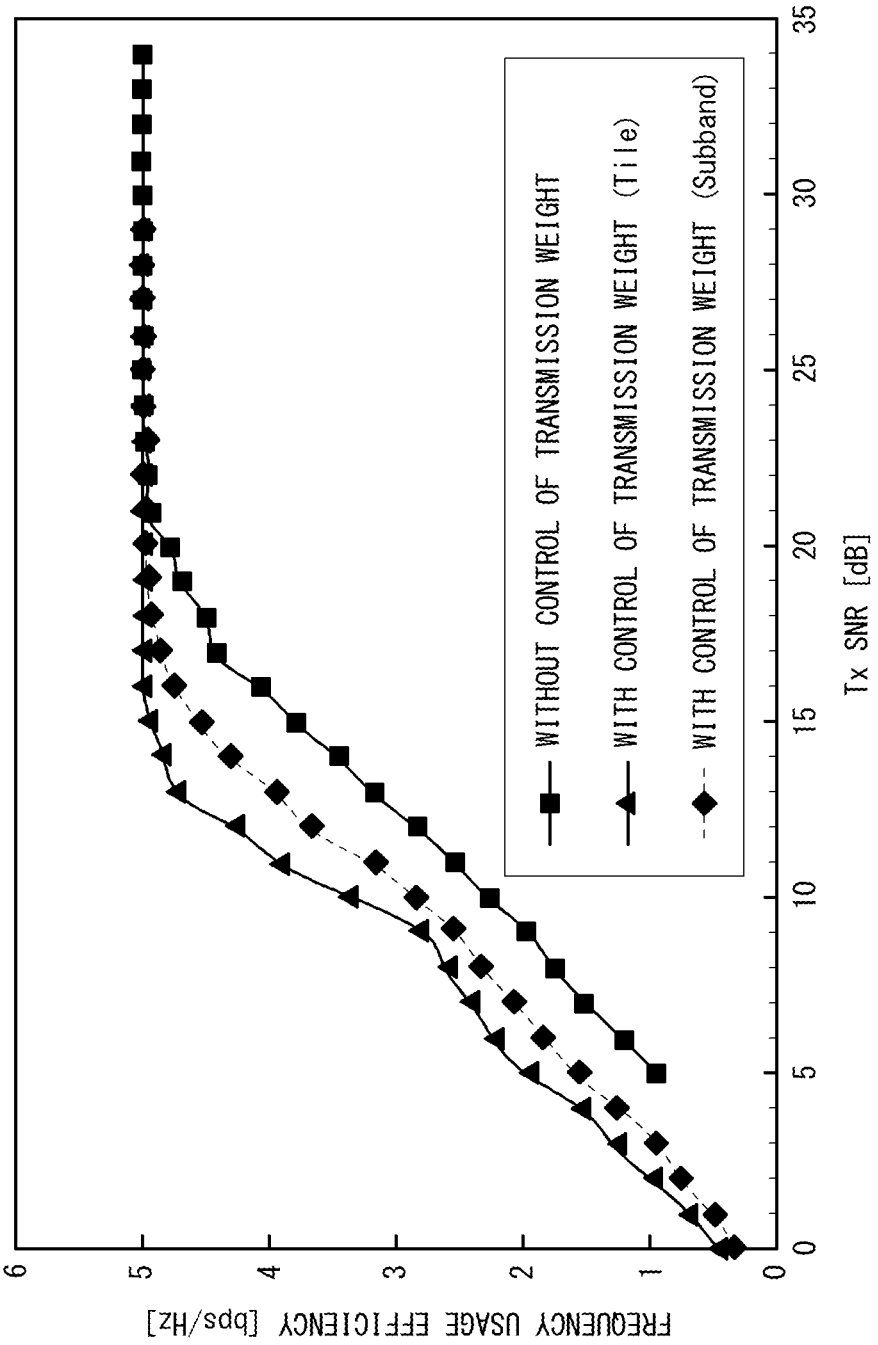
FIG. 6 is a diagram illustrating changes in frequency usage efficiency by transmission weight control.

FIG. 4 is a flowchart of operation of the communication terminal according to one embodiment of the present invention. Operation of each block of the communication terminal 1 is described in detail with reference to the flowchart.

When the communication terminal 1 receives the reference signal from the base station 2, the CSI calculation unit 20 of the communication terminal 1 obtains CSI of the subcarriers in the transmission weight application range from the reception unit 10 (S001). According to the present embodiment, it is assumed that the transmission weight application range includes 128 subcarriers ($N_{CSI}=128$), for example. However, it is obvious for those skilled in the art that the number of subcarriers in the transmission weight application range is not limited to 128.

The CSI power calculation unit 22 of the CSI calculation unit 20 calculates power of CSI ($Pow_k$, $0 \leq k \leq N_{CSI}$) of each subcarrier in the transmission weight application range by using Formula 3 (S002). In addition, the CSI average power calculation unit 21 calculates average power of CSI (Pow$_{ave}$) in the transmission weight application range by using Formula 4 (S003).

$$Pow_k = |CSI_k|^2 \quad \text{[Formula 3]}$$

$$= \begin{bmatrix} \left|\frac{y_{0,0}}{x_0}\right|^2 & \left|\frac{y_{0,1}}{x_1}\right|^2 & \cdots & \left|\frac{y_{0,TxAnt-1}}{x_{TxAnt-1}}\right|^2 \\ \left|\frac{y_{1,0}}{x_0}\right|^2 & \left|\frac{y_{1,1}}{x_1}\right|^2 & & \left|\frac{y_{1,TxAnt-1}}{x_{TxAnt-1}}\right|^2 \\ \vdots & & \ddots & \vdots \\ \left|\frac{y_{RxAnt-1,0}}{x_0}\right|^2 & \left|\frac{y_{RxAnt-1,1}}{x_1}\right|^2 & \cdots & \left|\frac{y_{RxAnt-1,TxAnt-1}}{x_{TxAnt-1}}\right|^2 \end{bmatrix}_k$$

$$= \left(\sum_{j=0}^{TxAnt-1}\sum_{l=0}^{RxAnt-1}\left|\frac{y_{l,j}}{x_j}\right|^2\right)_k$$

$$Pow_{Ave} = \frac{1}{N_{CSI}}|CSI_i|^2 \quad \text{[Formula 4]}$$

$$= \frac{1}{N_{CSI}}\sum_{i=0}^{N_{CSI}-1} \begin{bmatrix} \left|\frac{y_{0,0}}{x_0}\right|^2 & \left|\frac{y_{0,1}}{x_1}\right|^2 & \cdots & \left|\frac{y_{0,TxAnt-1}}{x_{TxAnt-1}}\right|^2 \\ \left|\frac{y_{1,0}}{x_0}\right|^2 & \left|\frac{y_{1,1}}{x_1}\right|^2 & & \left|\frac{y_{1,TxAnt-1}}{x_{TxAnt-1}}\right|^2 \\ \vdots & & \ddots & \vdots \\ \left|\frac{y_{RxAnt-1,0}}{x_0}\right|^2 & \left|\frac{y_{RxAnt-1,1}}{x_1}\right|^2 & \cdots & \left|\frac{y_{RxAnt-1,TxAnt-1}}{x_{TxAnt-1}}\right|^2 \end{bmatrix}_i$$

$$= \frac{1}{N_{CSI}}\sum_{i=0}^{N_{CSI}-1}\left(\sum_{j=0}^{TxAnt-1}\sum_{k=0}^{RxAnt-1}\left|\frac{y_{k,j}}{x_j}\right|^2\right)_i$$

The CSI drop determination unit 23 determines whether there is a drop of power of the CSI in the transmission weight application range based on results of calculations by the CSI average power calculation unit 21 and the CSI power calculation unit 22 (S004). This is to determine whether there is a drop in power because of a factor such as frequency selectivity and the like. Such drop of power is determined by whether power of the CSI of each subcarrier in the transmission weight application range calculated by the CSI power calculation unit 22 is lower than a determination standard (threshold) set based on average power of CSI in the transmission weight application range calculated by the CSI average power calculation unit 21. The determination standard may be average power itself of the CSI in the transmission weight application range calculated by the CSI average power calculation unit 21, or a value obtained by multiplication or division of the average power by a predetermined coefficient (for example, x0.8, x1.2, ½, ⅓ and the like) or by addition or subtraction (for example, +1, −0.5 as offset). Setting the determination standard higher than the average power allows determination of more drops of power of CSI, whereas setting the determination standard lower than the average power reduces determination of drops of power of CSI.

The region dividing unit 24 divides the transmission weight application range into small regions by selecting subcarriers with power of the CSI higher than the determination standard based on a result of determination by the CSI drop determination unit 23 and then defines the regions divided as small region i (i=1, 2 . . . ) (S005). Here, the small region is a region of the transmission weight application region excluding the subcarrier determined to have a drop of power by the CSI drop determination unit 23. That is, since the subcarriers in such a small region have no drop of power of CSI, each small region may be regarded as a set of subcarriers (communication channels) with good communication states.

In addition, there may be a case in which there is no subcarrier with drop of power of the CSI, such as when the determination standard is set low by the CSI drop determination unit 23 (No of S004). In this case, skipping division of the transmission weight application range by the region dividing unit 24, the operation shifts to step S010, which will be described below, to calculate average power of the weighed CSI from the CSI of the subcarriers in the transmission weight application range overall.

The small region CSI power calculation unit 25 calculates average power (POW$_{i\_Ave}$) of the CSI of the subcarriers included in each small region i divided by the region dividing unit 24, by using Formula 5.

$$Pow_{i\_Ave} = \frac{1}{N_{Small\_i\_CSI}}\sum_{l=0}^{N_{Small\_i\_CSI}}|CSI_l|^2 \quad \text{[Formula 5]}$$

$$= \frac{1}{N_{Small\_i\_CSI}}\sum_{l=0}^{N_{Small\_i\_CSI}} \begin{bmatrix} \left|\frac{y_{0,0}}{x_0}\right|^2 & \left|\frac{y_{0,1}}{x_1}\right|^2 & \cdots & \left|\frac{y_{0,TxAnt-1}}{x_{TxAnt-1}}\right|^2 \\ \left|\frac{y_{1,0}}{x_0}\right|^2 & \left|\frac{y_{1,1}}{x_1}\right|^2 & & \left|\frac{y_{1,TxAnt-1}}{x_{TxAnt-1}}\right|^2 \\ \vdots & & \ddots & \vdots \\ \left|\frac{y_{RxAnt-1,0}}{x_0}\right|^2 & \left|\frac{y_{RxAnt-1,1}}{x_1}\right|^2 & \cdots & \left|\frac{y_{RxAnt-1,TxAnt-1}}{x_{TxAnt-1}}\right|^2 \end{bmatrix}_l$$

$$= \frac{1}{N_{Small\_i\_CSI}}\sum_{l=0}^{N_{Small\_i\_CSI}-1}\left(\sum_{j=0}^{TxAnt-1}\sum_{k=0}^{RxAnt-1}\left|\frac{y_{k,j}}{x_j}\right|^2\right)_l$$

The particular small region determination unit 26 calculates the number of subcarriers (CSI) (small_i_CSI) included in each small region (S007). Then, the particular small region determination unit 26 selects a particular small region satisfying of Formula 6, based on the average power (POW$_{i\_Ave}$) of each small region obtained by the small region CSI power calculation unit 25 and the number of CSI included in each small region (S008). Here, num_small_region represents the number of small regions divided by the region dividing unit 24.

$$\text{Max}(Pow_{i\_Ave} \times N_{Small\_i\_CSI}), 1 \leq i \leq \text{num\_small\_region} \quad \text{[Formula 6]}$$

Formula 6 is for a selection of a small region having the highest total power of the CSI of the subcarriers obtained for each small region. As set forth above, the small region is the set of subcarriers (communication channels) with good communication state, and the particular small region determination unit 26 selects the small region with the best communication state among the small regions.

By using Formula 3, the particular small region CSI calculation unit 27 calculates power of the CSI of each subcarrier in the small region (Pow$_k$, 0≤k≤N$_{small\_i\_CSI}$) selected by the particular small region determination unit 26 by using Formula 6 (S009), and also calculates a weighed CSI value (CSI$_{w\_Ave}$) of the subcarrier in the small region by using Formula 7 (S010). Such CSI value is representative CSI (representative channel state information) in the transmission weight application range overall.

$$CSI_{w\_Ave} = \frac{1}{\sum_{k=0}^{N_{Small\_i\_CSI}-1} Pow_k} \sum_{k=0}^{N_{Small\_i\_CSI}-1} (Pow_k \times CSI_k) \quad \text{[Formula 7]}$$

$$= \frac{1}{\sum_{k=0}^{N_{Small\_i\_CSI}-1} Pow_k}$$

$$\left( \sum_{k=0}^{N_{Small\_i\_CSI}-1} \text{Re}(Pow_k \times CSI_k) + j \sum_{k=0}^{N_{Small\_i\_CSI}-1} \text{Im}(Pow_k \times CSI_k) \right)$$

Calculation of the representative CSI by the particular small region CSI calculation unit 27 is performed on the subcarriers in the small region with the best communication state selected by the particular small region determination unit 26 and weight is given in accordance with the power of the CSI of each subcarrier in the small region. Thus, the formula renders the subcarrier with a better communication state (higher CSI power) in the small region has more influence.

If there is no drop of power of the CSI at S004, Formula 7 is calculated for the CSI of all subcarriers in the transmission weight application range (that is, $N_{small\_i\_CSI}$ in Formula 7 is replaced with $N_{CSI}$). Since the subcarrier with a better communication state (higher CSI power) has more influence in such a case, it enables calculation of the representative CSI better than a simple average of CSI of all subcarriers in the transmission weight application range.

The transmission weight selection unit 30 selects the transmission weight based on the representative CSI ($CSI_{w\_Ave}$) provided from the particular small region CSI calculation unit 27 (S011). It is to be noted that, since a method to select a predetermined transmission weight from a certain CSI is known to those skilled in the art, a detailed description thereof is omitted. The transmission weight selection unit 30 stores a corresponding relation between the CSI and the transmission weight in advance and can select a transmission weight corresponding to the representative channel state information based on the corresponding relation. The transmission weight selection unit 30 provides the transmission weight index, corresponding to the transmission weight selected, as feedback to the base station 2 via the transmission unit 40.

The base station 2 can improve the communication characteristics of the feedback MIMO by selecting the transmission weight with such transmission weight index.

According to the present embodiment, since it is regarded that there is relatively less phase rotation of CSI in the region when there is no drop of CSI, it is possible to calculate the representative CSI suitable to the subcarrier which is expected to have the best channel capacity by performing process according to a power ratio. In addition, even if there is a drop, the range is divided into small regions to have less phase rotation and a representative CSI for a small region expected to have the best effect is calculated. Therefore, the transmission weight can be selected corresponding to the subcarriers of them. Although such a method does not select a transmission weight corresponding to a subcarrier with originally poor channel capacity, data allocated in such a subcarrier can be recovered by using an error correction scheme included in a system.

Although the present invention is described based on figures and embodiments, it is to be understood by those skilled in the art that many variations and modifications may be easily made based on disclosure of the present invention. Accordingly, such variations and modifications are included in a scope of the present invention.

Although the CSI drop determination unit 23 sets the determination standard of drop of the CSI based on the average power of the CSI in the transmission weight application range, it is also possible to use a predetermined invariable instead of such calculation of the average power. In addition, the particular small region determination unit 26 may select a particular small region from a plurality of small regions based only on the average power of each small region obtained by the small region CSI power calculation unit 25 or on the number of CSI in the small region. Moreover, the particular small region CSI calculation unit 27 may select the predetermined number of subcarriers with higher power in the small region, instead of weighted average of the CSI of the subcarriers in the small region, and use average of the CSI of only such selected subcarriers as the representative CSI.

Although power is used as a standard for determination of drop of the CSI, other standards such as phase and amplitude may also be used. For example, if the phase is used as the standard, the reception unit 10 detects phase of the CSI and the CSI drop determination unit 23 determines a portion where phase rotation is reversed between adjacent channels as a drop such that the region dividing unit 24 forms a small region between the CSIs with the phase rotating in reverse. In addition, if a focus is on a rotational amount of the phase, the CSI drop determination unit 23 determines a subcarrier with more rotational amount of the phase than a predetermined threshold as the subcarrier having drop of CSI, such that the region dividing unit 24 may form the small regions by selecting the subcarriers with the rotational amount of the phase lower than the predetermined threshold. Moreover, when the amplitude value is used as the standard, the reception unit 10 detects the amplitude and the CSI drop determination unit 23 determines a subcarrier with the amplitude lower than the predetermined threshold as the subcarrier having drop of CSI, such that the region dividing unit 24 may form the small regions by selecting the subcarriers with the amplitude higher the predetermined threshold. In addition, although mere CSI between antennas is described in the above embodiment, it is also possible to use a power level as a system multiplying the CSI by the weight of transmission and reception, as the standard, for example.

In addition, although the wireless communication method is assumed as UMB in the above each embodiment, the scope of the present invention is not limited to such wireless communication method but applicable also to any wireless communication method such as LTE (Long Term Evolution) corresponding to the feedback MIMO. For example, as stated above, in UMB a frequency band used for communications is divided into 8 subbands and each subband is divided into 8 tiles, each of which is divided into 16 subcarriers. Similarly, in LTE the frequency band used for communications is divided into 9 subbands as necessary and, in such a case, each subband is divided into 2 to 6 resource blocks (RBs), each of which is divided into 12 subcarriers. Therefore, by reading the resource block of LTE in place of the tile of UMB in the above description as necessary, the description of each embodiment may be understood as embodiment employing LTE. It is to be understood that in such a case the number of subbands, resource blocks (tiles) and subcarriers are changed correspondingly to LTE.

| REFERENCE SIGNS LIST | |
|---|---|
| 1 | communication terminal |
| 2 | base station |
| 3 | reception unit |
| 20 | CSI calculation unit |
| 21 | CSI average power calculation unit |
| 22 | CSI power calculation unit |
| 23 | CSI drop determination unit |
| 24 | region dividing unit |
| 25 | small region CSI power calculation unit |
| 26 | particular small region determination unit |
| 27 | particular small region CSI calculation unit |
| 30 | transmission weight selection unit |
| 40 | transmission unit |

The invention claimed is:

1. A wireless communication apparatus having a plurality of antennas comprising:
   a reception unit for receiving signals of channels in a predetermined frequency band from another wireless communication apparatus and obtaining channel state information of the channels;
   a channel state information calculation unit for dividing the predetermined frequency band into a plurality of regions, selecting a particular region from the plurality of regions based on a number of channels included in each of the plurality of regions and the channel state information of the channels, and calculating representative channel state information of the predetermined frequency band as a whole based primarily on the channel state information of the channels in the particular region;
   a transmission weight selection unit for selecting a transmission weight based on the representative channel state information calculated; and
   a transmission unit for transmitting identification information of the transmission weight to the another wireless communication apparatus.

2. The wireless communication apparatus according to claim 1, wherein the channel state information calculation unit divides the predetermined frequency band into the plurality of regions by selecting the channel with power of the channel state information higher than a predetermined threshold.

3. The wireless communication apparatus according to claim 2, wherein the predetermined threshold comprises an average power of channel state information.

4. The wireless communication apparatus according to claim 1, wherein the channel state information calculation unit divides the predetermined frequency band into the plurality of regions at a position where phase of the channel state information rotates in reverse between adjacent channels.

5. The wireless communication apparatus according to claim 1, wherein the channel state information calculation unit divides the predetermined frequency band into the plurality of regions by selecting the channels with rotational amount of phase of the channel state information less than a predetermined threshold.

6. The wireless communication apparatus according to claim 1, wherein the channel state information calculation unit divides the predetermined frequency band into the plurality of regions by selecting the channels with amplitude of the channel state information higher than a predetermined threshold.

7. The wireless communication apparatus according to any one of claims 1 to 6, wherein the channel state information calculation unit calculates a weighted average value of the channel state information of the channels included in the particular region as the representative channel state information of the predetermined frequency band as a whole, based on power of the channel state information of the channels included in the particular region.

8. The wireless communication apparatus according to claim 7, wherein the transmission weight selection unit stores a corresponding relation between the channel state information and the transmission weight and selects the transmission weight stored corresponding to the representative channel state information.

9. The wireless communication apparatus according to any one of claims 1 to 6, wherein the transmission weight selection unit stores a corresponding relation between the channel state information and the transmission weight and selects the transmission weight stored corresponding to the representative channel state information.

10. The wireless communication apparatus according to claim 1, wherein the representative channel state information of the predetermined frequency band as a whole is different from an average channel state information of the predetermined frequency band.

11. The wireless communication apparatus according to claim 1, wherein the wireless communication apparatus is configured to communicate using at least one of the Ultra Mobile Broadband (UMB) wireless communication method, or the Long Term Evolution (LTE) wireless communication method.

12. A wireless communication method of a wireless communication apparatus having a plurality of antennas, comprising the steps of:
   receiving signals of channels in a predetermined frequency band from another wireless communication apparatus and obtaining channel state information of the channels;
   dividing the predetermined frequency band into a plurality of regions;
   selecting a particular region from the plurality of regions based on a number of channels included in each of the plurality of regions and the channel state information of the channels;
   calculating representative channel state information of the predetermined frequency band as a whole based primarily on the channel state information of the channels in the particular region;
   selecting a transmission weight based on the representative channel state information calculated; and
   transmitting identification information of the transmission weight to the another wireless communication apparatus.

13. The wireless communication method according to claim 12, wherein at the step of calculation, a weighted average value of the channel state information of the channels included in the particular region is calculated as the representative channel state information of the predetermined frequency band as a whole, based on power of the channel state information of the channels included in the particular region.

14. The wireless communication method according to claim 12 or 13, wherein at the step of selecting the transmission weight, the transmission weight corresponding to the representative channel state information is selected based on a corresponding relation between the channel state information and the transmission weight stored in advance.

15. The wireless communication method according to claim 12, wherein the representative channel state information of the predetermined frequency band as a whole is different from an average channel state information of the predetermined frequency band.

16. The wireless communication method according to claim 12, wherein the predetermined frequency band is divided into the plurality of regions by selecting the channel with power of the channel state information higher than a predetermined threshold, and wherein the predetermined threshold comprises an average power of channel state information.

17. The wireless communication method according to claim 12, wherein wireless communication is implemented using at least one of the Ultra Mobile Broadband (UMB) wireless communication method, or the Long Term Evolution (LTE) wireless communication method.

* * * * *